June 7, 1955   W. W. MOUNT   2,709,895
JET THRUST BURNER POWER GENERATOR
Filed July 22, 1949   5 Sheets-Sheet 2

INVENTOR
WADSWORTH W. MOUNT
BY R. J. Dearborn
ATTORNEY

June 7, 1955  W. W. MOUNT  2,709,895
JET THRUST BURNER POWER GENERATOR
Filed July 22, 1949  5 Sheets-Sheet 4

INVENTOR
WADSWORTH W. MOUNT
BY R. J. Dearborn
ATTORNEY

June 7, 1955  W. W. MOUNT  2,709,895
JET THRUST BURNER POWER GENERATOR
Filed July 22, 1949  5 Sheets-Sheet 5

INVENTOR
WADSWORTH W. MOUNT
BY R. J. Dearborn
ATTORNEY

United States Patent Office 2,709,895
Patented June 7, 1955

2,709,895

JET THRUST BURNER POWER GENERATOR

Wadsworth W. Mount, Summit, N. J.

Application July 22, 1949, Serial No. 106,126

22 Claims. (Cl. 60—49)

This invention relates to power generation and particularly to an improved power generator for obtaining an increased amount of usable power from the combustion of given amounts of fuel.

This invention may be briefly described as a unitary power generator, peculiarly adapted to the generation of power in large installations, wherein the energy of motion obtained by utilizing the momentum forces set in motion by the combustion of fuel and air in ram jet motors, or by the combustion of fuel and oxidizer in rocket motors, is compounded with the energy obtained from the conversion of the high temperature exhaust from the jet motors into steam, to produce a total amount of usable power appreciably greater than that produced from an equivalent amount of fuel in a conventional power generation installation.

In general, in accordance with the invention, there is provided a comparatively large power wheel having a centrally disposed shaft adapted to turn at as high a peripheral speed as is practical. On the periphery of this wheel are mounted a plurality of reaction power cells or jet thrust burners, which may be ram jet motors or rocket motors. Surrounding the power wheel and positioned to receive the hot exhaust gases from the jet thrust burners is an annular boiler. The heat from the exhaust gases is then utilized to generate steam or is otherwise converted into usable power.

The shaft of the power wheel is connected to a suitable power converter, such as an electric generator to convert the energy of rotation of the wheel, created by the net thrust of the jet thrust burners, into usable power. The power generated from the utilization of the exhaust gases is preferably utilized to produce added thrust upon the shaft of the power wheel or upon an associated member driven by the shaft of the power wheel. The compounding of these power outputs provides a total power output appreciably greater than that obtained in conventional power generating installations from equivalent amounts of fuel.

The jet thrust burners mounted on the periphery of the power wheel will deliver greater amounts of power at greater peripheral speeds. In the case of ram jet motors, they will be designed to operate at a predetermined air intake speed. This air intake speed should be in excess of 400 miles per hour or 588 feet per second.

In many conventional steam-electric generation installations substantially only the heat transferred to the boiler water is utilized to produce usable power. In many conventional steam-electric generating plants, the overall efficiency, i. e., the ratio of the net power available externally of the plant to the theoretical power available from the input fuel, is relatively low as many losses are encountered in the conversion of steam to usable power. In such an installation an overall efficiency of 34% is an acceptable high figure, with many installations operating at an overall efficiency appreciably below this value. In such a system, using conventional fuel burners, the increase in volume of the combustion gases, due to burning alone, produces no useful work except, perhaps, to slightly increase the draft of the furnace. When jet thrust burners burn fuel and compressed air or fuel and oxidizer in a confined space, the increase in gas volume resulting from the combustion is utilized to develop reaction forces for the production of mechanical energy. The amount of heat utilized in producing thrust in the ram jet motors or in rocket motors is converted into mechanical energy at very high efficiencies. The large remainder of the heat available from the fuel is exhausted from the ram jet motors at extremely high temperatures, which if not utilized, as in the case of aircraft using such motors, makes this type of motor quite inefficient on an overall basis.

The unitary power generator embodied in this invention provides for the production of increased amounts of usable power by compounding the power obtained at very high efficiencies from the ram jet motors, with the power obtained from the use of the exhaust heat at approximately the 34% overall efficiency found in conventional high-grade steam-electric generating plants. Thus, the more power that may be developed from the ram jet motors at high efficiencies, with respect to the amount of the power obtained from the balance of the heat in the exhaust gases, the greater the total output of usable power that may be obtained from the compounding of the power outputs thereof, and the smaller and cheaper the entire installation will be for a specified power rating.

One of the major factors leading to the increased overall efficiencies obtainable by the teachings of this invention is the high temperatures of the exhausted combustion products from the ram jet motors. These temperatures are in the vicinity of 3000 to 4000 degrees F. and closely approximate the combustion temperatures in conventional burner installations. The exhaust gases leave the ram jet burners with a jet velocity of about 3000 miles per hour or 4380 feet per second.

In conventional rocket motors, combustion temperatures are somewhat higher, probably in the neighborhood of 4000 to 5500 degrees F. and have jet velocities in the vicinity of 6000 to 8000 feet per second. The combustion temperatures in the ram jet motors will increase with the increased compression ratios utilized, and will approach the maximum allowable temperatures without disassociation, and, at these temperatures, the heat that is converted to mechanical energy is utilized by the ram jet motors at very high efficiencies.

The thrust theoretically obtainable from ram jet type motors has not been realized in such type motors designed to meet the weight and drag requirements of aircraft and guided missile use. A practical realization of the powers theoretically available will be more nearly approached in the design of ram jet motors for an installation of the type embodied in this invention. This is possible primarily because the diffuser and combustion chambers of ram jet motors will be matched for a single design speed and single air density, without being restricted as to weight and external cross sectional area since they will be nested inside the smooth outer surfaces of the power wheel.

The ram jet motors will be designed to obtain maximum thrust from the fuel burned, with little regard for the overall efficiency of the motors themselves as heat engines. This means that any want of efficiency in the ram jet burners (and these ram jet motors are in this instance being used as fuel burners) as producers of mechanical power, is directly compensated by the full absorption of the heat energy from the discharge gas.

Actual performance figures on ram jet motors, built for aircraft and guided missiles and therefore restricted in their design to air flight requirements, have been published and are incorporated in the following table:

| Propulsion Device | Lbs. of thrust per lb. of Engine Weight | Lbs. of thrust per sq. ft. of Projected Area | Lbs. of fuel per lb. of thrust per hour |
|---|---|---|---|
| Reciprocating Engine-Propeller | 0.8 | 230 | 0.5 |
| Turbojet | 2.5 | 500 | 1.5 |
| Ram Jet | 10 | 1,500 | 2.8 |
| Rocket (Liquid Fuel) | 35 | 10,000 | 13 |

The above figures will be used for the purposes of example and comparison only in the following explanatory material relating to the unitary power generator embodied in the invention. It is calculated that these figures, primarily for ram jets, will be substantially improved as it appears that ram jet motors designed for use on this power wheel would not have to contend with most of the great variations in operating conditions that restrict the development and performance of ram jet motors designed for use in aircraft and guided missiles, such as changes in compression ratio due to altitude, changes in air-fuel ratios that upset the efficient matching of the inlet pressure recovery diffuser to the combustion chamber, changes in flight speed, changes in the temperature of the inlet air and many more.

The above figures will be used for the purposes of example and comparison only in comparing the calculated output from a given amount of fuel in a compounded unitary power generation installation embodying the principles and teachings of the invention, with the output of a conventional plant utilizing an equivalent amount of fuel and operating at an overall efficiency of 34%.

If a power wheel having four ram jet burners, each weighing 200 pounds is assumed, each burner is capable of developing 2000 pounds of thrust at a fuel consumption of 2.8 pounds of fuel per hour per pound of thrust. The total fuel consumption for the four burners will be, therefore, 22,400 pounds of fuel per hour. If these burners are mounted on a power wheel 20 feet in diameter adapted to turn at 972 R. P. M., thus producing a peripheral speed of 1026 feet per second, approximately the speed of sound at sea level or Mach 1, a set of practical operating conditions is obtained utilizing existing metal strengths and existing ram jet performance figures. The mechanical power developed by the wheel mounting the four ram jet burners may be obtained by multiplying the total generated thrust of 8000 pounds by the peripheral speed of 1026 feet per second, and dividing the product by a conversion factor of 550. The horsepower figure obtained is 14,923 H. P. or, equivalently, 11,128 kilowatts of usable power.

The available power present in the exhaust heat from the ram jet burners may be obtained by calculating the total heat input to the burners, i. e., 22,400 pounds of fuel per hour multiplied by 18,000 B. t. u. per pound, which provides a total calculated heat input of 403,200,000 B. t. u. The amount of heat converted by the ram jet burners in creating mechanical work is obtained by multiplying the 11,128 kilowatts by the conversion factor 3,413 (B. t. u. per kilowatt), which provides a resulting figure of 37,979,864 B. t. u. This value subtracted from the total heat input of 403,200,000 B. t. u. leaves 365,220,136 B. t. u. available for use in the exhaust gases.

Dividing the heat available from the exhaust gases by the conversion factor 3,413 and multiplying the result by the overall efficiency figure of 34% illustrates that 36,382 kilowatts would be produced by a conventional power plant operating on an amount of heat equivalent to that present in the exhaust gases. If this output figure is added to the 11,128 kilowatts produced by the power wheel, an overall total power figure of 47,510 kilowatts is obtained from the compounded system. The overall efficiency of the compounded system is thus 40% as compared to the conventional figure of 34%.

If the total heat input, i. e. 403,200,000 B. t. u. was utilized in a conventional steam electric generating plant, a power output, at the 34% overall efficiency, of 40,166 kilowatts would be obtained. It should be noted that the figures in the above example, utilizing ram jet motors on the power wheel as fuel burners, in accordance with the teachings of this invention, creates an increase of about 17% of usable power over that conventionally obtained.

If the peripheral speed of the ram jet motors is increased, the power output from the wheel and from the compounded system would also increase for a given amount of fuel input. If the total thrust figures used in the above example were applied to a power wheel turning at a peripheral speed of 1600 feet a second, the power wheel would develop 17,350 kilowatts and the exhaust heat would provide an additional 34,000 kilowatts, providing a compounded total of 51,354 kilowatts. This output of 51,354 kilowatts would provide an overall increase of about 27% in usable power as compared with the power developed from an equivalent heat input in a conventional steam electric generating plant.

The increase in power that arises from the application of the invention will be still greater than the above figures if these jet thrust burners are used on steam power plants which operate, in their steam turbine systems, at less than 34% overall efficiencies. To provide flexibility of operation to meet varying load requirements, several of these jet thrust burner units can be built around a large central power station, all supplying power directly while feeding their exhaust heat into the station's main boilers. Thus one or more of the jet thrust units could be shut down while the others kept operating.

The utilization of the principles and teachings of this invention would largely eliminate the need for blowers and other conventional auxiliary equipment normally required to supply air and fuel to conventional fuel burners. These blowers and other auxiliary equipment are conventionally assumed to consume approximately 5 or 6% of the generator's power output in a steam turbine system. The utilization of the novel compounded power generator embodied in this invention dispenses with the necessity of many blowers and other auxiliary equipment. This factor will tend to raise the overall efficiency of the integral steam system from the figure of 34% to approximately 40%. This increase in overall efficiency of the steam generating system would further raise the overall efficiency of the compounded unitary power generation installation. However, windage losses on the power wheel will probably reduce this saving to some extent.

Another method of increasing the power output from the power wheel would be to mount, say, four ram jet motors on the top edge of the periphery receiving their fresh combustion air through an air duct rising above the wheel, as illustrated, then to mount four more ram jet motors on the underside of the periphery receiving their fresh combustion air from a bottom duct leading in under the annular boiler and up to the annular space in which the mouths of the lower ram jet motors would travel; with all eight ram jet motors exhausting into the same annular boiler.

If liquid fuel rocket motors are applied to the periphery of a power wheel instead of ram jet motors, the higher exhaust temperatures and greater thrusts available, coupled with the smaller weight and frontal area of rocket motors, permit the use of a power wheel that would operate at much higher peripheral speeds with consequent power increases. In addition, this wheel would require no additional means to supply the rocket motors with air as a second fuel line would carry the oxidizer. Furthermore, much smaller units could be utilized to produce an equivalent amount of thrust and consequently increased amounts of thrust could be obtained by mounting increased numbers of rocket units on the periphery of the wheel.

An object of this invention, therefore, is the provision of an improved unitary power generator to produce appreciably greater amounts of usable power than that produced from an equivalent amount of fuel in a conventional power generation installation.

Another object of this invention is the provision of a unitary power generator which will produce increased amounts of usable power from a given amount of fuel.

Another object of this invention is the provision of a unitary power generator capable of producing power at substantially less cost than is customary with present day power generation equipment.

Another object of this invention is the provision of a unitary power generator providing an overall efficiency appreciably greater than the overall efficiencies obtainable with conventional power generation installations.

Another object of this invention is the provision of a unitary power generator wherein the mechanical energy, obtainable from the momentum forces set in motion by the combustion of fuel and air or fuel and oxidizer in a reaction motor power cell, is compounded with the energy obtainable from the conversion of the high temperature exhaust heat into steam to produce increased amounts of usable power.

Another object of this invention is to provide a unitary power generator which will realize an increased power output from a predetermined amount of fuel through conversion of part of the heat developed into mechanical energy at high thermal efficiency.

Another object of this invention is the provision of a unitary power generator utilizing a plurality of rotating thrust producing burners.

A further object of this invention is the provision of a unitary power generator including a plurality of self-pressurizing combustion burners which require no external energy in the supplying of fuel and air or fuel and oxidizer in the correct proportions for the combustion thereof, and which burners produce substantial quantities of useful power.

A still further object of the invention is the provision of a unitary power generator capable of an increased power output while being relatively compact in size.

Referring to the drawings.

As set forth generally above, this novel power generator produces increased amounts of useful power through the compounding of the energy of motion obtained by utilizing the momentum forces set in motion by the combustion of fuel in reaction power cells with the energy obtained from the conversion of the high temperature exhaust from the reaction power cells into steam.

The presently preferred construction of a power generator for developing the energy of motion from the reaction power cells and converting the energy available in the high temperature exhaust therefrom into steam will be discussed and described first. The novel constructions for compounding these outputs will be discussed and described at a later point in the specification.

Figure 1:
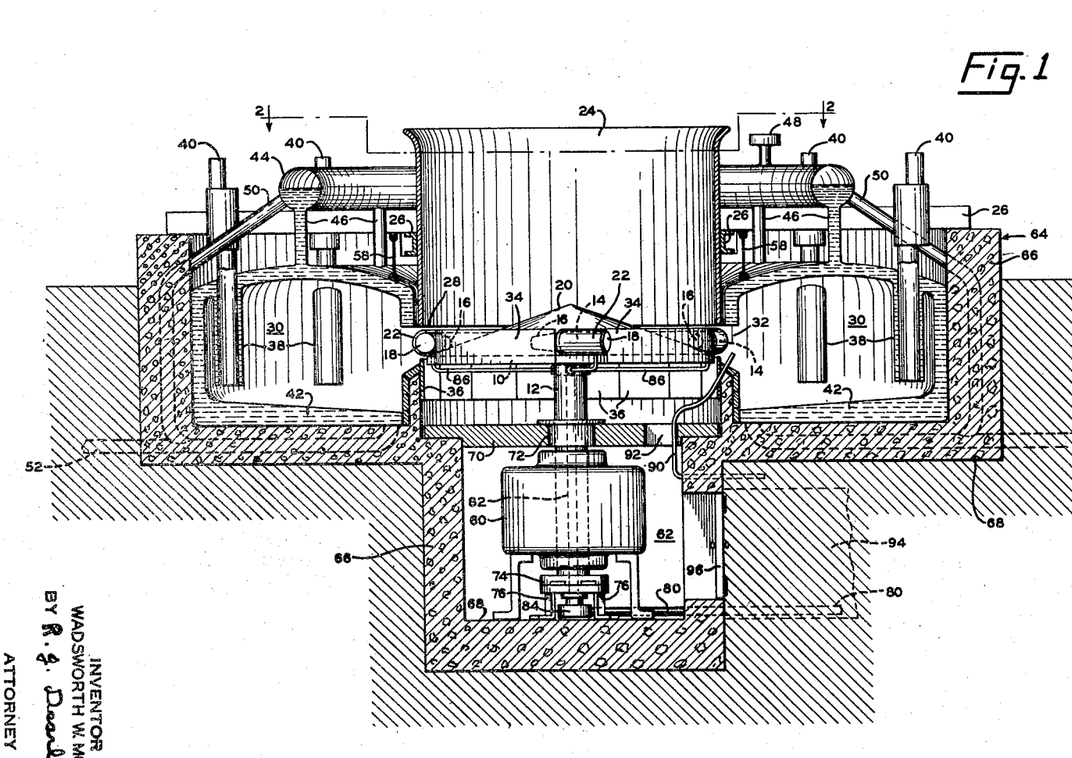
Fig. 1 is a sectional view, in elevation, of a portion of the unitary power generator.
Figure 2:
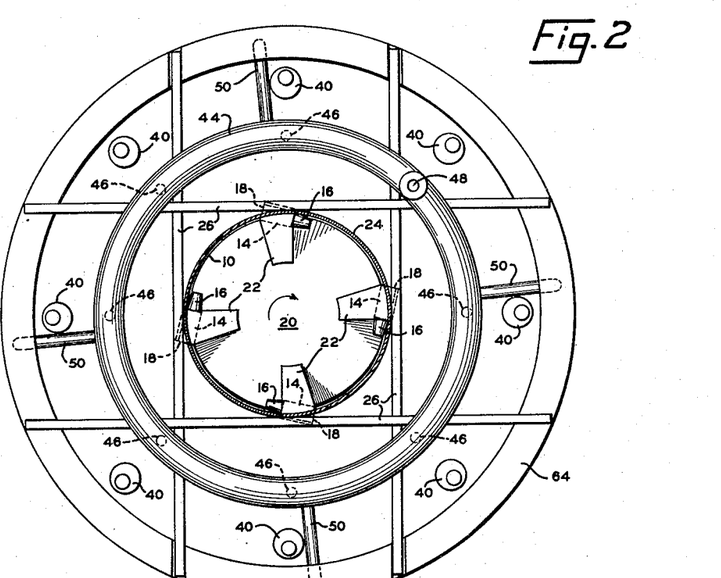
Fig. 2 is a plan view on the line 2—2 of the Fig. 1

Referring to Figs. 1 and 2, there is provided a relatively large balanced power rotor or wheel 10 mounted on and adapted to drive a centrally disposed shaft 12. The power rotor 10 is suitably constructed to turn at as high a peripheral speed as is practical. Mounted on the periphery of the power rotor 10 are a plurality of reaction power cells or jet thrust burners, such as the athodyd power units or ram jet motors 14. In the presently preferred embodiment of the invention, as illustrated in the drawings, four ram jet motors are mounted in a predetermined spaced relationship on the periphery of the power rotor 10. However, the drawings should not be interpreted as limiting the number of power units which may be mounted on the periphery of the rotor 10.

The ram jet motors 14 are mounted so that the air intake ends of the diffuser sections 16, are positioned inside the periphery of the rotor, and the exhaust nozzles 18 thereof may extend beyond the periphery or are positioned to expel the exhaust gases beyond the periphery of the rotor 10 while maintaining an approximately tangential direction of thrust. To reduce windage losses and to guide the intake air to the vicinity of the air intake sections of ram jet motors 14, the upper surface of the rotor 10 is made conical in shape or is covered with a smooth surfaced conical shaped cap 20. This conical shape 20 of the top of the rotor 10 makes it possible to use bands or straps 22 to secure the ram jet motors 14 in place on the periphery of the rotor 10. These straps 22 are shown wrapped around the ram jet motors 14 so that the upper portions thereof are disposed horizontally between the top of the ram jet motor 14 and the portion of the rotor cap 20 to which secured. The lower portions of the straps 22 are fastened to the rotor 10 beneath the ram jet motors 14 after having encircled the outside surface of the motors. The straps 22 will be suitably secured, as by welding, to the rotor 10 and the conical top 20 in a manner calculated to support the jet thrust burners 14 against centrifugal thrust and collapsing forces.

The air supply for the ram jet motors 14 mounted on the periphery of the power rotor 10 is obtained from a centrally located annular fresh air intake duct 24 which is disposed concentrically with and above the power rotor 10. It should be noted that the ram jet motors 14 are mounted so that the air intake sections thereof are positioned within the periphery of the air intake duct 24. The air intake duct 24 is supported by the supporting beams 26 and is positioned so that its bottom edge 28 is closely adjacent the ram jet motors 14 on the rotor 10.

Externally adjacent the power rotor and positioned to receive the hot exhaust gases from the ram jet motors 14 is an annular fire chamber 30. The annular chamber 30 is of a shape suitable to efficiently withdraw the radiant heat from the exhaust gases and is sized to receive the exhaust gases without direct impingement of the exhaust on the surfaces of the chamber. The chamber 30 is provided with an annular slotted opening 32 of a size closely encompassing the exhaust diameters of the ram jet motors 14. To close the opening 32 of the fire chamber 30 intermediate the jet motors 14, the periphery of the power rotor 10 has mounted thereon rim plates 34. To maintain the opening 32 of the fire chamber 30 as small as is practically possible, an adjustable segmented annular plate 36 is provided. Adjusting the position of this plate 36 effectively adjusts the size of the opening 32 of the fire chamber 30 and prevents heat loss from said fire chamber into the working space beneath the rotor 10.

Positioned within the fire chamber 30 are a plurality of vertically disposed exhaust members 38 to vent the exhaust gases to the atmosphere. Mufflers, such as 40, are associated with each of the exhaust members 38 to reduce the noise of the exhausts from the ram jet motors 14.

Enclosing the fire chamber 30 and the exhaust members 38 is a jacket 42 adapted to be filled with water or other suitable material such as mercury or suitable hydrocarbons. The jacket 42 is connected to an annular steam drum 44 by a plurality of risers 46. If the jacket 42 is filled with water for the generation of steam, the steam therein generated may be tapped off from the annular steam drum 44 through a steam connecting line 48. The generated steam may be drawn through the line 48 and transmitted to superheaters, steam turbines, etc. for conversion into usable power. The annular steam drum 44 is further connected to the bottom of the water jacket 42 by a plurality of return or downcomer pipes 50 which connect with other return or feedwater pipes 52 coming from the remainder of the steam conversion system, not shown in this Fig. 1.

Associated with the vertical shaft 12 is a power converting unit 60, which may be a torque converter, but is shown in the preferred embodiment illustrated in Fig. 1 as an electrical generator having its rotor mounted on the driven shaft 12. The power converting unit 60 is used to convert the energy of rotation of the shaft 12 into usable electric power. This generator 60 may be designed to be used as a starting motor to get the wheel rotating at speed sufficient to supply proper amounts of air to the ram jet motors to support combustion and to produce positive thrust.

The above described power generator is preferably installed in a dual annular vault largely below the ground level. There is provided a low central portion 62 housing the power converting unit 60 and an enlarged upper portion 64 housing the fire chamber 30 and its associated steam generating installation. The dual vault is preferably constructed of relatively thick concrete walls 66 and a thick concrete floor 68. Covering the lower central portion 62 of the dual housing vault is a cover member 70. The cover member 70 should be of sufficient strength to partially support the shaft 12, the power rotor 10 associated therewith, and the top bearing 72 of the power converting unit 60. The lower section of the shaft 12 is supported by a thrust bearing 74 spaced from the floor 68 by support members 76. The concrete walls 66, defining the upper enlarged portion 64 of the vault, provide terminal supports for the main supporting beams 26 on which the annular steam drum 44 and its associated members 26 are supported. The supporting beams 26 may also be used to support the segments of the housing for the fire chamber 30 disposed adjacent the air duct 24 through connecting support members such as 58.

The fuel for the four ram jet motors 14 is introduced to the power generator from an external supply, not shown, through a fuel line 80. The fuel line 80 is introduced into the lower portion 62 of the vault through the wall 66 and is connected to a fuel passage 82, centrally bored in the shaft 12, by a suitable rotary joint 84. Thus fuel will enter the power generator through the fuel line 80, the rotary joint 84 and up through the centrally bored fuel shaft 82 through the shaft 12. At the top of the shaft 12, a plurality of external fuel connecting lines 86 are provided, which connect the centrally disposed fuel shaft 82 to the individual ram jet motors 14. The fuel in the fuel connecting lines 86 will be forced outwardly into the ram jet motors 14 by the centrifugal force developed by the turning power rotor 10. If desired, the fuel lines to the peripherally located reaction power cells could be contained within the power rotor 10.

In the embodiment of the invention illustrated in the drawings the fuel lines are adapted primarily for the utilization of fuel oil, or suitable liquid fuels. However, it should be understood that modifications in the construction would permit the use of gaseous or powdered fuels, such as powdered coal.

An igniter for the ram jet motors has been included in the power generation installation in the embodiment of the invention illustrated in the drawings. To ignite the ram jet motors 14 there is provided a gas pipe 90 connected to an external supply, not shown, and introduced through the concrete walls 66 into the lower portion 62 of the vault. The pipe 90 is then led up through a manhole opening 92 in the cover member 70 and extended into the fire chamber 30 adjacent the path of the ram jet motors 14.

To provide access to the power converting unit 60 for repairs and inspection, there is provided an underground passage 94 terminating in a door 96 in the lower portion 62 of the vault.

The portion of the specification immediately following relates to the construction for compounding the outputs of the above described power generator.

Figure 13:
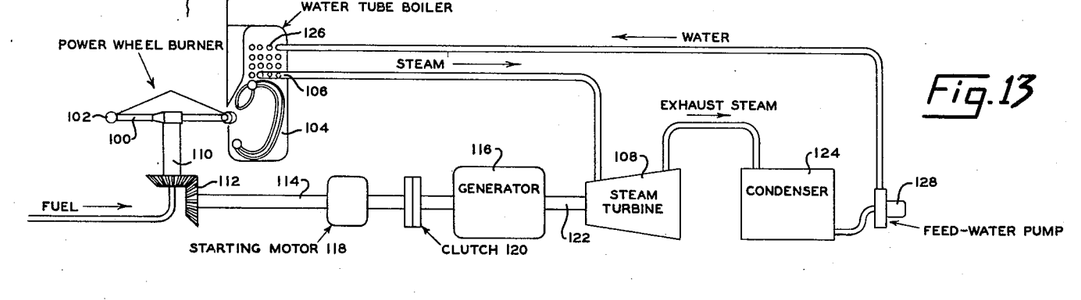
Fig. 13 is a schematic representation of the presently preferred embodiment of the invention.

In Fig. 13 a power generator of the type described in detail above, is schematically represented and included in a compounded installation for the production of useful power. A power wheel 100, having jet thrust ram jet motors 102 mounted thereon, is disposed adjacent a boiler 104. The boiler 104 is positioned to receive the exhaust gases from the ram jet motors. The steam developed in the boiler 104 is passed through a superheater section 106 and introduced into a steam turbine 108. The shaft 110 of the power rotor 100 is schematically represented as driving a shaft 114 connected to an electric power generator 116 through the gears 112. The generator 116 is driven directly by the reaction force generated in the jet thrust burners 102. The steam produced in the boiler 104 from the high temperature exhaust gases and introduced into the steam turbine 108 is also used to provide a compound drive for the generator 116 through the shaft 122 directly connecting the turbine 108 and the generator 116. The exhaust steam from the steam turbine 108 is then preferably led to a condenser 124 and the condensate therefrom is returned to an economizer section 126 in the boiler 104 by a water pump 128. The above schematic representation of the unitary power generator thus provides for the development of useful power from the generator 116 through the compounding of the mechanical energy obtained from the reaction forces produced by the jet thrust burners 102, and the steam developed from the exhaust heats therefrom. The schematic representation also includes a starting motor 118 for bringing the power rotor 100 up to speed before ignition of the jet thrust burners 102. A clutch member 120 is associated therewith to reduce the load on the starting motor by disconnecting the generator 116 during the starting periods.

Figure 14:
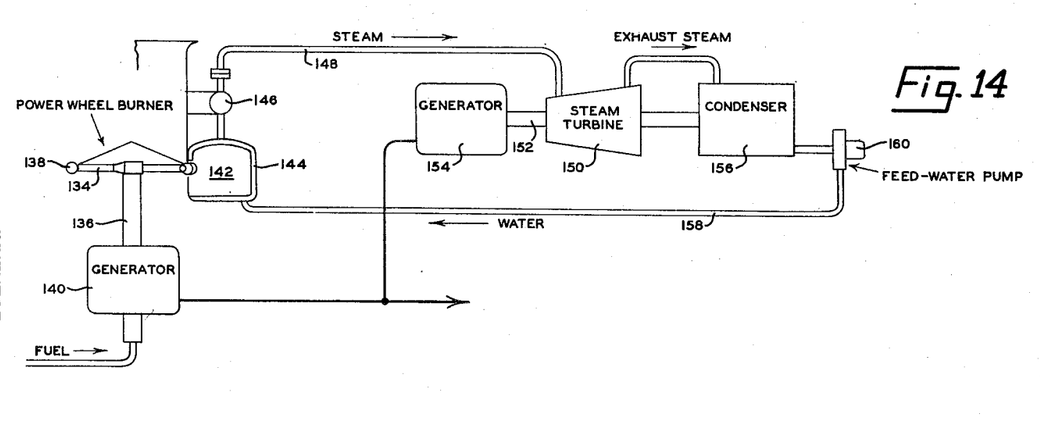
Fig. 14 is a schematic representation of an alternative embodiment of the invention.

Fig. 14 schematically illustrates an alternative compounding construction embodying the unitary power generator wherein the electrical outputs derived from the conversion of the mechanical energy of the jet thrust burners and the conversion of the exhaust heats therefrom are compounded after generation. There is provided a rotor 134 mounted on a shaft 136 having a plurality of jet thrust burners 138 positioned on its periphery. The reaction forces developed by the jet thrust burners and the mechanical energy resulting therefrom are converted to usable power in an electric generator 140 associated with the shaft 136. The exhaust gases from the jet thrust burners 138 are directed into an annular fire chamber schematically represented at 142 and the heats therein are used to develop steam in the associated water jacket 144 and steam drum 146. The steam from the steam drum 146 is then transmitted through a pipe 148 and introduced into a steam turbine 150. For the purposes of simplicity the economizer and superheater installations have been omitted from this representation. The steam turbine 150 drives a shaft 152 which is mechanically coupled to a second electric power generator 154. The exhaust steam from the steam turbine is then preferably led to a condenser 156 and the condensate therefrom is returned to the water jacket 144 through the pipe 158 by the water pump 160. The electric output from the generator 154 is then compounded with the electrical output from the generator 140.

It is obvious that the exhaust heat created by the operation of this ram jet driven power wheel need not necessarily be used to create steam but may be used for any purpose for which such heat is desired, or the steam created may be used as process steam instead of being converted into electric or mechanical power, and that the mechanical or electrical power created by the ram jet driven power wheel itself when added to the mechanical equivalent of the exhaust heat at the efficiency of the exhaust heat system will give a total for the entire system greater than can be obtained by burning the same amount of fuel with conventional fuel burners.

Figure 3:
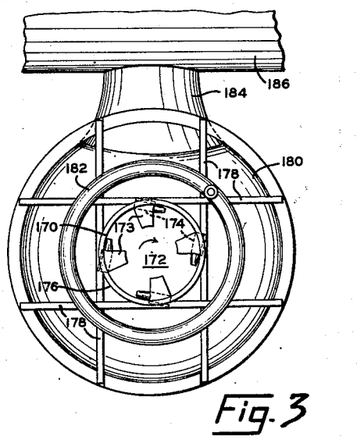
Fig. 3 is a plan view of an alternative embodiment of the invention.

Fig. 3 shows a modification of the invention. There is provided a power wheel 170 having a smooth conical top surface 172, and having a plurality of reaction power cells, such as the jet thrust burners 174, disposed on its periphery and fastened thereon by straps 173. The jet thrust burners 174 are mounted in a manner similar to that described above with relation to Fig. 1. Disposed above the power wheel 170 is an annular air intake duct 176 which is positioned and supported by the supporting beams 178. As described above, with relation to Fig. 1, the reaction forces developed by the jet thrust burners 174 are utilized to rotate the power wheel 170. The exhaust gases from the jet thrust burners 174 are received in an annular fire box 180 and the heat contained therein is utilized to develop steam in an annular steam drum 182. The annular fire box 180, in this embodiment of the invention, is provided with an exhaust duct 184 which is connected to a separate heat exchanger 186. The heat exchanger 186 may be a boiler around which one or more of these power burners are placed, or other suitable means for utilizing the remaining heat contained in the exhaust gases. An installation of this construction is easily adapted to a multiple type installation wherein the exhaust gases from a plurality of power generators of the type described above are fed into a common heat exchanger, such as 186, for further utilization of the heats contained therein, and to provide flexibility of output as the number of power burners in operation is varied.

Figure 4:
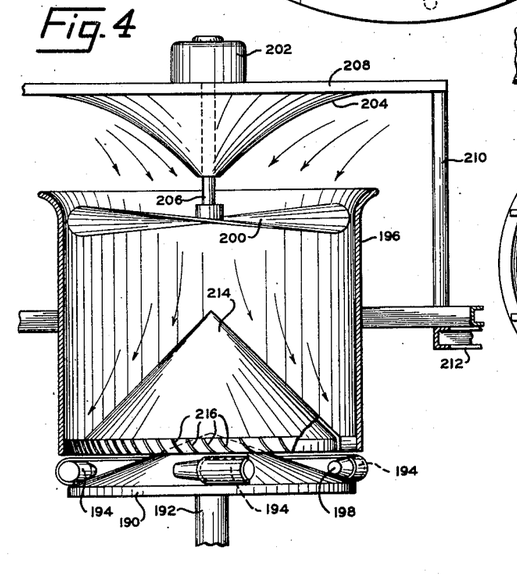
Fig. 4 is a fragmentary elevational view of a means of pressurizing the intake air to the jet thrust producing burners.

Fig. 4 illustrates a presently preferred construction for pressurizing the intake air to the ram jet motors. There is provided a power rotor 190 mounted on a centrally disposed shaft 192 and having a plurality of jet thrust burners, such as the ram jet motors 194, mounted on the periphery thereof.

The ram jet motors 194 will be designed to operate at a fixed air intake speed, this air intake speed being primarily determined by the peripheral velocity of the power wheel 190. This peripheral speed will be in excess of 400 miles per hour or, equivalently 588 feet per second. Increased speeds will result in the delivery of more power, other factors being maintained constant. In order to obtain an increase in the air intake speed without increasing the designed speed of the power rotor 190, it may be desirable in some installations to pressurize the intake air by providing a compressor or a blower unit in the air intake duct 196 and by directing the intake air at a high velocity into the air intake openings 198 of the ram jet motors 194 as they turn together with the power wheel 190. One method of pressurizing the intake air is to build air scoops directly on the power wheel to direct the air into the ram jet motors to increase their compression ratios. It is within the contemplation of this invention to combine the peripheral movement of the ram jet motors 194 on the power wheel 190 with an induced flow of high velocity air directed into the air intake openings of the jet motors to obtain a resulting higher air intake speed and higher compression ratio than would be possible to obtain by utilizing the peripheral speed of the ram jet motors 194 alone.

In Fig. 4 there is shown one construction for increasing the air intake speed for the ram jet motors 194. There is provided an air impeller 200 driven by an electric motor, such as 202. The air impeller 200 may be of a size equivalent to the diameter of the air intake duct 196. There is also provided an adjacent air directing surface 204 to provide a smooth flow of air into the mouth of the fresh air duct 196. The air impeller 200, the directing surface 204, and the motor 202 may be supported on a mounting plate and weather cover 208 and supporting struts, such as 210, connected to the supporting beams 212. Mounted within the air intake duct 196 and below the air impeller 200 is a conical air flow directing surface 214. This conical directing surface 214 directs the moving air within the duct 196 to a position adjacent the air intake ends of the ram jet motors 194. The periphery of the air directing surface 214 preferably will include vanes 216 which may be curved to more accurately direct the air into the entry sections of the ram jet motors 194. Vanes 216 are attached to the wall of duct 196 and thereby support the conical directing surface 214 above the power wheel 190.

The above described air intake system will provide for an effective pressurizing of the intake air to the ram jet motors and it is contemplated that the increased power outputs therefrom will more than offset the energy used to induce the higher air intake speeds.

Figure 5:
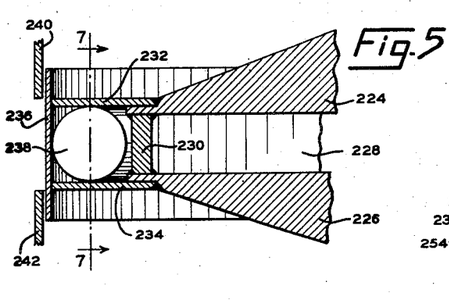
Fig. 5 is a fragmentary, sectional view, in elevation, illustrating a mounting of the jet thrust producing burners in the rim of the rotor.
Figure 6:
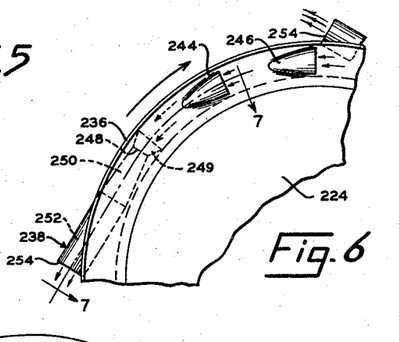
Fig. 6 is a plan view of the mounting illustrated in Fig. 5.
Figure 7:
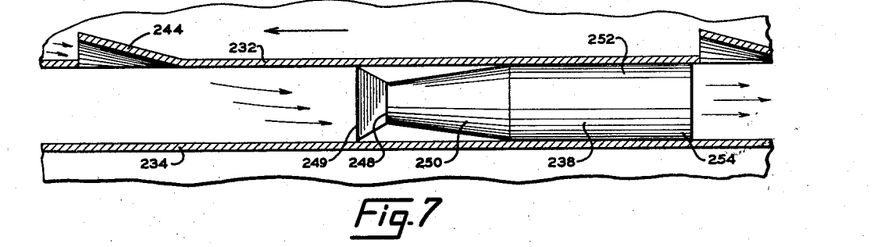
Fig. 7 is a section on the lines 7—7 in Figs. 5 and 6.

Figs. 5, 6 and 7 illustrate a preferred mounting for the ram jet motors on the periphery of a power rotor. The power rotor is shown as being constituted of two spaced members 224 and 226 having an annular space 228 contained therebetween. The ends of the members 224 and 226 are closed by an upright connecting member 230. Mounted on the spaced members 224 and 226 are a pair of horizontally disposed mounting members 232 and 234 which abut a vertical rim member 236. The upright connecting member 230, mounting members 232 and 234, and the rim member 236 cooperate to form a mounting for a ram jet motor such as 238. The rim member 236 abuts the adjacent fire chamber walls represented at 240 and 242. A power rotor constructed of two spaced members, as shown, is especially desirable when large volumes of fuel, such as gas or powdered coal, are to be supplied to the jet thrust burners. The space between said members provides a convenient fuel supply conduit to the jet thrust burners.

Figs. 6 and 7 illustrate the positioning of the ram jet motors, utilizing a construction shown in Fig. 5, on the periphery of the power rotor. There are provided air intake scoops such as 244 and 246 which may be shaped to pressurize the intake air as well as merely to feed sufficient air for maintenance of thrust generation, two of such members being shown on Fig. 6. The air intake scoops direct the air into the space formed by the members 230, 232, 234 and 236, from which it is rammed into the throat 248 of the ram jet motor 238 guided by the converging duct 249. The air passes through the throat 248 into the diffuser section 250 and from thence to the combustion chamber 252. The ram jet motors are positioned on the periphery of the power rotor so that the air intake end, or throat 248, is located within the periphery of the rotor and the exhaust nozzle or trailing end 254 of the ram jet engine 238 extends outwardly from the periphery of the rotor to direct the exhaust gases into the annular fire chamber of an associated boiler member. Although extending the trailing end 254 of the ram jet motor 238 beyond the periphery of the power wheel creates a drag loss, it also creates a partial vacuum immediately behind the motor which is calculated to increase the thrust of the motor.

Figure 8:
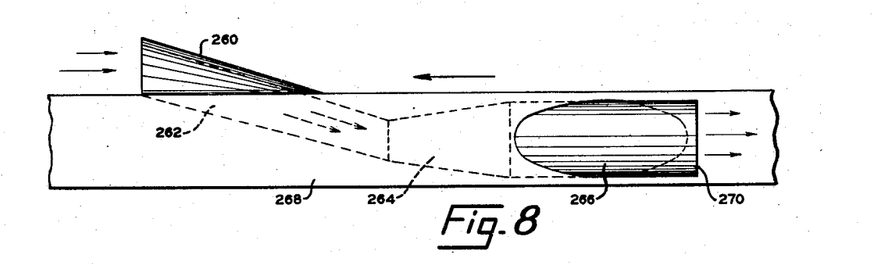
Fig. 8 is a fragmentary view of an alternative mounting for the burners in the rim of the rotor.
Figure 9:
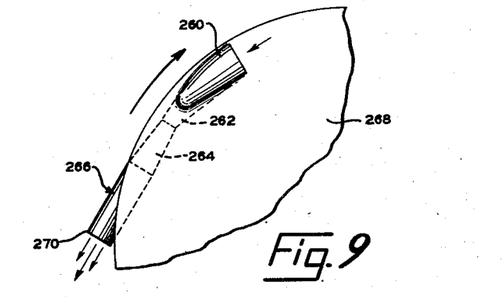
Fig. 9 is a plan view of the mounting illustrated in Fig. 8.

Figs. 8 and 9 illustrate an alternative mounting for the ram jet engines. In this embodiment the air enters a single air scoop 260 and is transmitted through a passage 262 directly into the mouth of the diffuser 264 of the ram jet motor 266. As described above in connection with Figs. 5, 6 and 7, the air intake end of the ram jet motor 266 is positioned within the periphery of the rotor 268 and the exhaust trailing end 270 is positioned outside the periphery of the rotor 268. However, in this mounting the motor is secured in a hole bored directly in the edge of the power wheel and only one low angle air scoop 260 per motor appears on top of the wheel 268.

Figures 10, 11:
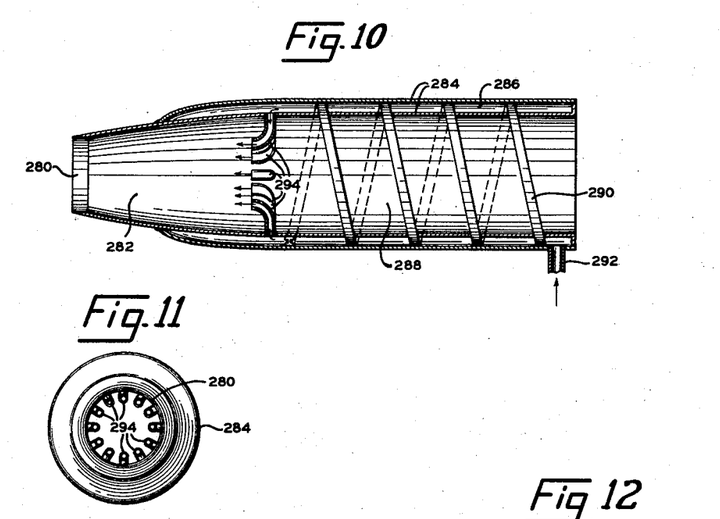
Fig. 10 is an elevation, partially in section, of a ram jet motor with regenerative cooling.
Fig. 11 is a front view of the motor shown in Fig. 10.

Figs. 10 and 11 illustrate a preferred construction for a ram jet engine to be used in conjunction with the power rotor. There is provided a throat or air intake end 280 and a gradually enlarging diffuser section 282. The main body portion of the jet motor is formed of a cylindrical double walled shell 284. The walls of the shell are spaced to provide an annular space 286 therebetween. The double shelled wall 284 encompasses a majority of the length of the ram jet motor and particularly encompasses the combustion chamber 288. Contained within the annular space 286 is a helical guiding and reinforcing vane 290 to which the double walls are preferably attached. Fuel is introduced into the double shelled wall through the fuel line 292 and is guided in a helical path by the guiding vane 290 to a plurality of fuel injection members 294 positioned in front of the combustion chamber 288. In this construction the fuel traverses the length of the combustion chamber 288 of the ram jet motor before reaching the fuel injection members 294. By extending the fuel injection members 294 into the air stream they will also function as flame holders. This action results in effectively placing a regenerative cooling chamber around the combustion chamber 288 and provides for a regeneratively cooled ram jet motor.

If liquid fuel rocket motors are mounted on the periphery of the power rotor instead of the ram jet motors described above, great increases in power are obtainable. At the present day, suitable fuels and oxidizers for rocket motors have not been developed which are sufficiently economical for a power generation installation of the type described above. However, the increased exhaust temperatures, i. e., up to 5500 degrees F., the increased thrust available, i. e., 35 pounds of thrust to one pound of engine weight, and the smaller weight and frontal area of the rocket motors as compared to ram jet motors make possible a design of a power rotor for operation at much higher speeds and higher thrusts than those obtainable utilizing ram jet motors. Such a wheel would require no auxiliary means such as an air duct to supply the motors with air as a second fuel line could carry the oxidizer in a manner similar to that described above with relation to the fuel lines for the ram jet motors. In addition, rocket motors could be spaced much closer together around the periphery of the power rotor with the exhaust nozzles directing the exhaust heats into the narrow receiving slot on the inside diameter of the annular fire chamber of a suitable boiler installation.

Figure 12:
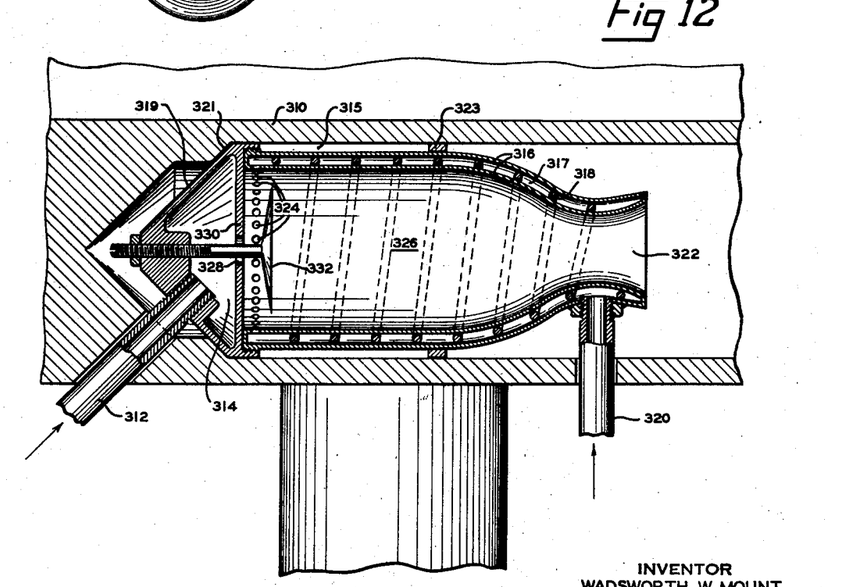
Fig. 12 is an elevation, partially in section, of a regeneratively cooled rocker motor mounted in the rim of the power rotor.

Fig. 12 illustrates a preferred construction for a rocket motor adapted for use on the periphery of a power wheel or rotor such as 310. There is provided an oxidizer intake line 312 connected to an oxidizer chamber 314. The main body of the rocket motor is formed of a double walled cylindrical shell 316. Contained within the shell 316 is a helical guiding member 318. Fuel is introduced into the annular space 317 formed by the double walled shell 316 in the vicinity of the exhaust nozzle 322 by the fuel line 320. The motor is regeneratively cooled by the constant flow of fuel within the annular space 317 from the fuel line to the fuel injection openings 324 at the forward end of the combustion chamber 326. The helical guiding member 318 guides the flow of fuel contained in the space 317. The chamber 314 is connected to the frontal portion of the combustion chamber 326 by the opening 328 in the front wall 330 of the combustion chamber 326. Also provided adjacent the fuel injection openings 324 is an adjustable dispersal plate 332 which insures a thorough mixing of the fuel and oxidizer immediately prior to ignition.

The rocket motors of the type described above are again mounted in a bored opening 315 in the edge of the power wheel 310 so that the exhaust nozzle 322 is positioned so as to direct its exhaust gases outwardly beyond the periphery of the wheel and so that the exhaust therefrom is directed into the annular fire chamber of a suitable boiler installation. The nose section 319 presses against a shoulder 321 on the inner end of the bore 315 to transmit the thrust of the rocket motor to the periphery of the power wheel 310. A ring 323 properly positions the motor in the bore 315.

It is particularly significant that in the structure of my invention the arrangement of the jet motors 14, 102, 138, 174, 194, 238 and 266 on the periphery of their rotors 10, 100, 134, 170, 190, 224, and 268 respectively and the annular exhaust chambers, e. g. 30 and 142, are such that there is a complete separation between the fresh air supply and the exhaust gases. This arrangement permits the complete collection and efficient use of the exhaust heat from all the embodiments of jet thrust burners illustrated and described.

In the case of ram jet thrust generators, e. g. 14, 194, and 238, this arrangement is important for a number of reasons, one of which is that it prevents the exhaust gases from being picked up and mingled with the fresh air supply to the detriment of the efficiency of the power generator.

Moreover, in certain of the modifications, as shown in Fig. 4, for example, this basic construction makes possible full control of the fresh air feed and provides for supplying the air under superatmospheric pressure so that the air feed into the ram jet thrust burners 194 is increased over that which results from rotation of the rotor.

The jet motors illustrated are free from external heating by their exhaust gases because they revolve with the rotor in a relatively cool body of air which is introduced through intake ducts 24 and 196 for example, and discharge outside of or beyond the path of rotation.

Since the exhaust gases are discharged into a separate annular combustion chamber, e. g. 30 and 142, the full temperature of these gases is available for the generation of steam or other analogous uses.

In accordance with the provisions of the patent statutes, I have herein described the principle of operation of this invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. A power generator, comprising a balanced rotor having a centrally disposed shaft, a plurality of ram jet thrust generators mounted in a predetermined spaced relationship adjacent the periphery of said rotor for imparting rotary motion thereto, said ram jet thrust generators being mounted so that the locus of the trailing ends thereof is concentric with and outwardly radially displaced from the locus of the leading ends thereof, a power converter associated with said shaft for converting the energy of rotation of said shaft into power, an annular chamber disposed adjacent the periphery of said rotor and positioned to receive the high temperature exhaust from the thrust generators, a boiler associated with said chamber for utilizing the heat energy present in said exhaust to vaporize a material, and means associated with said boiler for developing power therefrom.

2. A power generator, comprising a balanced rotor having a centrally disposed shaft, a plurality of jet thrust burners mounted in a predetermined spaced relationship adjacent the periphery of said rotor for imparting rotary motion thereto, said burners positioned so that the exhaust therefrom is expelled outwardly beyond the periphery of the rotor, a power converter associated with said shaft for converting the energy of rotation of said shaft into power, an annular chamber having an aperture positioned to receive the high temperature exhaust from the jet thrust burners said chamber having substantial clearance radially outward from the periphery of said rotor to avoid direct impingement of the exhaust on the surfaces thereof, a boiler associated with said annular chamber for utilizing the heat of said exhaust for vaporizing a material and means associated with said boiler for developing power therefrom.

3. A power generator, comprising a balanced rotor having a centrally disposed shaft, a plurality of jet thrust burners mounted in a predetermined spaced relationship adjacent the periphery of said rotor for imparting high speed rotary motion thereto, said burners being mounted so that the locus of the trailing ends thereof is outwardly concentric with respect to the locus of the leading ends thereof, a power converter associated with said shaft for converting the energy of rotation of said shaft into power, an annular chamber disposed adjacent the periphery of said rotor and positioned to receive the high temperature exhaust from the jet thrust burners, said chamber shaped to avoid direct impingement of the exhaust on the surfaces thereof, an annular boiler associated with said annular chamber for utilizing the heat of said exhaust to change a material from a liquid to a vapor, and means associated with said annular boiler for developing power therefrom.

4. A power generator, comprising a balanced rotor having a centrally disposed shaft, a plurality of combustion burners providing direct thrust from the combustion products therefrom mounted in a predetermined spaced relationship on the periphery of said rotor for imparting high speed rotary motion thereto, said burners being positioned so that the locus of the trailing ends thereof is outwardly concentric with the locus of the leading ends thereof, a power converter associated with said shaft for converting the energy of rotation of said shaft into power, an annular chamber positioned to receive the high temperature exhaust from the combustion burners and shaped to avoid direct impingement of the exhaust on the surfaces thereof, a fixed annular boiler associated with said chamber for utilizing the heat energy exhausted by said burners to vaporize a material, and means associated with said annular boiler for developing power therefrom.

5. A power generator, comprising a driven power rotor, a stator cooperating with said driven rotor for the production of power, a driving rotor coupled to the driven power rotor, a plurality of jet thrust burners mounted in a predetermined spaced relationship adjacent the periphery of said driving rotor for imparting rotary motion thereto, an annular chamber disposed wholly outside the periphery of said driving rotor and positioned to receive the exhaust from said jet thrust burners, an aperture on the inner circumference of said chamber to allow free passage of the exhaust from the jet thrust burners into said chamber, a boiler associated with said chamber for utilizing the heat energy contained in said exhaust for vaporizing a material, and means associated with said boiler for the production of power therefrom.

6. A power generator, comprising a driven power rotor, a stator cooperating with said driven rotor for the production of power, a driving rotor coupled to the driven power rotor, a plurality of ram jet thrust burners mounted in a predetermined spaced relationship adjacent the periphery of said driving rotor for imparting high speed rotary motion thereto, an annular chamber disposed adjacent the periphery of said rotor and having an aperture therein positioned to receive the high temperature exhaust from said jet thrust burners, said chamber shaped to avoid direct impingement of the exhaust on the surfaces thereof, an annular boiler associated with said annular chamber for utilizing the heat energy contained in said exhaust for vaporizing a material, and means associated with said boiler for the production of power therefrom.

7. A power generator, comprising a rotary power conversion member having a driven rotor and a stator, an apertured annular steam generation member, a jet propelled driving rotor coupled directly to said driven rotor and exhausting directly into the annular steam generation member through the aperture therein, and means associated with said steam generation member for production of power therefrom.

8. A power generator, comprising a balanced driving rotor having a centrally disposed shaft, a plurality of combustion burners providing direct thrust from the combustion products therefrom mounted in a predetermined spaced relationship on the periphery of said rotor for imparting high speed rotary motion thereto, a driven rotor coupled to said shaft, a stator cooperating with said driven rotor for converting the energy of rotation of said shaft to electric power, an annular chamber disposed adjacent the periphery of said driving rotor and positioned to receive the high temperature exhaust from said burners through an aperture therein and shaped to avoid direct impingement of the exhaust on the surfaces thereof, an annular boiler associated with said chamber for utilizing the heat energy exhausted by said burners to vaporize a material, and means associated with said annular boiler for developing power therefrom.

9. A unitary power generator, comprising a balanced rotor having a centrally disposed shaft, a plurality of jet thrust burners mounted in a predetermined spaced relationship adjacent the periphery of said rotor for imparting rotary motion thereto, a power converter coupled to said shaft for converting the energy of rotation into power, an annular chamber disposed wholly outside the periphery of said rotor and positioned to receive the high temperature exhaust from the jet thrust burners, an aperture on the inner circumference of said chamber to allow free passage of the exhaust from the jet thrust burners into said chamber, and means associated with said chamber and said power converter for converting the heat energy of said exhaust into power.

10. A unitary power generator comprising, a balanced rotor having a centrally disposed shaft, a plurality of jet thrust burners mounted in a predetermined spaced relationship adjacent the periphery of said rotor for imparting rotary motion thereto, a power converter coupled to said shaft for converting the energy of rotation into power, an apertured annular chamber disposed adjacent the periphery of said rotor and positioned to receive the high temperature exhaust from the jet thrust burners, said chamber shaped to avoid direct impingement of the exhaust on the surfaces thereof, a boiler associated with said annular chamber for utilizing the heat energy of said exhaust to change a material from a liquid to a vapor and means connecting said boiler and said shaft for applying the energy converted by said boiler to produce added thrust upon said shaft.

11. A unitary power generator, comprising a balanced rotor having a centrally disposed shaft, a plurality of jet thrust burners mounted in a predetermined spaced relationship adjacent the periphery of said rotor for imparting rotary motion thereto, a power converter coupled to said shaft for converting the energy of rotation into power, an apertured annular chamber positioned to receive the high temperature exhaust from the jet thrust burners and shaped to avoid direct impingement of the exhaust on the surfaces thereof, an annular boiler associated with said annular chamber for utilizing the heat energy of said exhaust to vaporize a material, a turbine having a rotor mounted on said shaft and a stator, and means intermediate the boiler and the turbine for further treating and introducing said material into said turbine to produce added thrust upon said shaft.

12. A unitary power generator, comprising a balanced rotor having a centrally disposed shaft, a plurality of combustion burners providing direct thrust from the combustion products therefrom, mounted in a predetermined spaced relationship adjacent the periphery of said rotor for imparting high speed rotary motion thereto, a driven rotor coupled to said shaft, a stator cooperating with said driven rotor for converting the energy of rotation of said shaft into electric power, an annular chamber disposed adjacent the periphery of said rotor and apertured to receive the high temperature exhaust from the combustion burners, said chamber shaped to avoid direct impingement of the exhaust on the surfaces thereof, an annular boiler associated with said annular chamber for utilizing the heat energy of said exhaust to vaporize a material, a turbine having a rotor mounted on the shaft and a stator, and means intermediate the boiler and the turbine for further treating and introducing said material into the turbine to produce added thrust upon said shaft.

13. A power unit, comprising a rotor, a plurality of ram jet burners tangentially positioned adjacent the periphery of the rotor and adapted to impart rotary motion thereto, and a boiler having fluid abutting surfaces therein shaped to form an annular chamber into which the exhaust from the ram jets is discharged.

14. A power unit, comprising a rotor, a plurality of ram jet burners tangentially positioned adjacent the periphery of the rotor and adapted to impart rotary motion thereto, and a boiler having fluid abutting surfaces therein shaped to form an annular chamber into which the exhaust from the ram jet is discharged, said annular chamber being relatively narrow axially and relatively large circumferentially to absorb the radiant heat from the high temperature exhaust discharge and sized to avoid direct impingement of the exhaust on the outer walls thereof.

15. A power unit, comprising a disc shaped rotor, a plurality of ram jet burners tangentially mounted thereon for driving said rotor and for discharging a whirling flame of high temperature exhaust gases, and an annular combustion chamber open at its inner circumference to receive said exhaust gases and shaped to avoid direct impingement of said exhaust gases on its outer circumference.

16. A power unit, comprising a disc shaped rotor, a plurality of ram jet burners tangentially mounted thereon for driving said rotor and for discharging a whirling flame of high temperature exhaust gases, an annular combustion chamber open at its inner circumference to receive said exhaust gases and shaped to avoid direct impingement of said exhaust gases on its outer circumference, and fluid-containing heat absorbing members shaped to conform to the walls of said annular chamber.

17. A power unit, comprising a rotor having a plurality of ram jet propulsion motors tangentially mounted thereon, said motors being positioned to drive the rotor and to discharge a whirling circumferential flame of high temperature exhaust gases beyond the periphery of the rotor, a boiler having an annular combustion chamber provided with a relatively small opening on its inner circumference into which the jet motors discharge the exhaust gases, said combustion chamber being sized to avoid direct impingement of said exhaust gases on the surfaces thereof, and fluid containing members mounted in the walls of said chamber for extracting the radiant heat of said whirling flame exhaust gases.

18. A power unit, comprising a boiler having a combustion chamber in the shape of a hollow torus ring of relatively large diameter and having a narrow annular opening at its inner circumference, and a power rotor having a plurality of jet thrust burners tangentially mounted on the periphery thereof, said power rotor being positioned concentrically within the torus ring with the jet thrust burners thereon discharging into the annular opening therein.

19. A power unit, comprising a boiler having a combustion chamber in the shape of a hollow torus ring of relatively large diameter and having a narrow annular opening at its inner circumference, a power rotor having a plurality of jet thrust burners tangentially mounted on the periphery thereof, said power rotor being positioned concentrically within the torus ring with the jet thrust burners thereon discharging into the annular opening therein, and heat absorbing members contained within the inner walls of said chamber and positioned to avoid direct impingement of the whirling flame exhaust gases on the surfaces thereof.

20. A power unit, comprising a hollow torus ring-shaped annular boiler having a narrow annular opening on its inner circumference, a rotor concentrically mounted within the torus ring, and jet power motors mounted adjacent the circumference of the rotor for driving said rotor and positioned to discharge the high temperature exhaust gases therefrom into said annular boiler through said narrow annular opening.

21. A power unit, comprising a boiler having a torus ring shaped combustion chamber, a rotating power wheel concentrically mounted within the ring-shaped combustion chamber, and a plurality of jet power motors mounted on said wheel for driving the same and positioned to discharge the high temperature exhaust gases from said jet power motors outwardly and into the combustion chamber.

22. A power generator comprising a rotor, a plurality of ram jet burners positioned on the periphery of the rotor, a duct largely concentric with the rotor and through which fresh air is led to the intake of the jet burners, said duct having substantially the same diameter as the diameter of the periphery of said rotor, means for maintaining air in the intake duct under superatmospheric pressure, intake nozzle means to increase the velocity of the pressurized air as it leaves the intake duct, and means for absorbing the heat from the jet exhaust.

References Cited in the file of this patent

UNITED STATES PATENTS

| Number | Name | Date |
| --- | --- | --- |
| 1,945,608 | Hill | Feb. 6, 1934 |
| 2,115,338 | Lysholm | Apr. 26, 1938 |
| 2,220,066 | Cornell | Nov. 5, 1940 |
| 2,444,742 | Lutjen | July 6, 1948 |
| 2,465,856 | Emigh | Mar. 29, 1949 |
| 2,486,990 | Sharpe | Nov. 1, 1949 |
| 2,499,863 | Hart | Mar. 7, 1950 |
| 2,523,655 | Goddard | Sept. 26, 1950 |
| 2,590,109 | Lindenbaum | Mar. 25, 1952 |
| 2,603,947 | Howard | July 22, 1952 |